Nov. 15, 1960  N. BEECHER ET AL  2,960,557
ARC FURNACE FOR THE PRODUCTION OF METALS
Filed Oct. 2, 1958
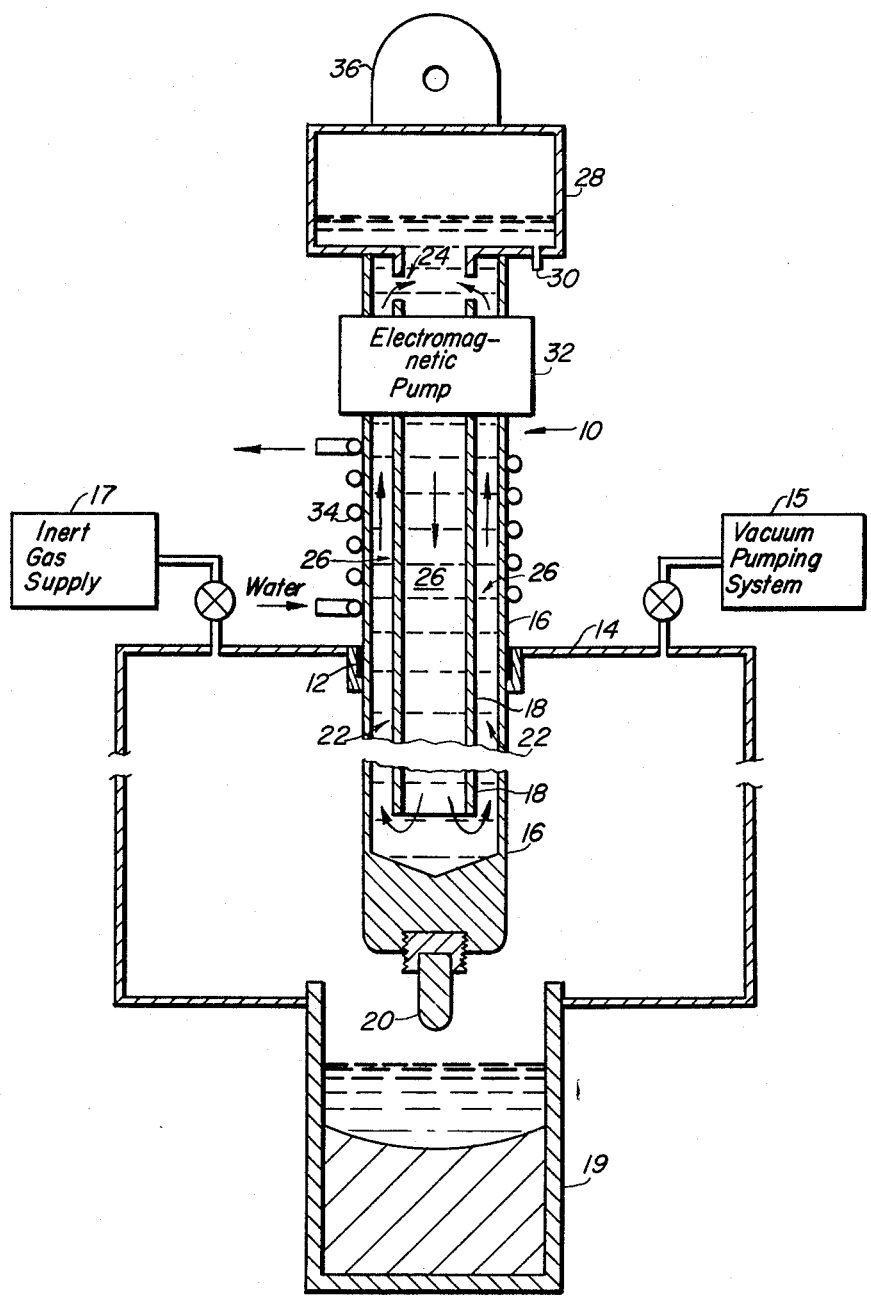
INVENTORS
Norman Beecher
BY Milo P. Hnilicka, Jr.
Oliver W. Hoeges

United States Patent Office 2,960,557
Patented Nov. 15, 1960

2,960,557

ARC FURNACE FOR THE PRODUCTION OF METALS

Norman Beecher and Milo P. Hnilicka, Jr., Concord, Mass., assignors to National Research Corporation, Cambridge, Mass., a corporation of Massachusetts Filed Oct. 2, 1958, Ser. No. 764,920

6 Claims. (Cl. 13—31)

This invention relates to the production of metals and more particularly to an arc melting furnace containing a non-consumable arc forming electrode.

A principal object of the present invention is to provide an improved furnace of the above type for use in the arc melting of reactive metals such as titanium and zirconium.

Another object of the invention is to provide a furnace of the above type which has improved safety features.

Other objects of the invention will in part be obvious and will in part appear hereinafter.

The invention accordingly comprises the apparatus possessing the construction, combination of elements and arrangement of parts which are exemplified in the following detailed disclosure, and the scope of the application which will be indicated in the claims.

For a fuller understanding of the nature and objects of the invention reference should be had to the following detailed description taken in connection with the accompanying single figure of drawing which is a sectional view of one embodiment thereof.

Due to the high melting points and high reactivity of refractory metals, such as titanium, arc melting techniques, particularly "skull" melting, and cold mold arc melting, have become quite widely accepted by industry. Arc melting is usually carried out under vacuum or inert gas conditions by subjecting the metal to be melted to an extremely hot electrical arc. The metal to be melted usually serves as one of the electrodes for supporting an arc from one or more electrodes. When one of the electrodes employed is of the non-consumable type, then a cooling arrangement must be provided for cooling the electrode to a certain extent to disperse some of the heat of the arc so as to prevent melting of the electrode and thus contamination of the melt with electrode material. In the past, water cooled electrodes have been employed for arc melting titanium and other reactive metals. However they possess the disadvantage that a leak in the electrode can permit water to contact the molten reactive metal resulting both in the generation of steam and reaction of water and steam with the metal. The resulting explosion may cause serious injury to or kill personnel as well as destroying the equipment. In the present invention, there is provided an electrode cooled by at least one alkali metal and preferably a sodium-potassium alloy. Thus no water, or other material which on contact with the molten refractory metal can result in disaster, is present in the electrode.

The arc furnace of the present invention is particularly designed for the melting of reactive refractory metals, such as titanium and comprises a gas-tight housing, means for creating a substantially inert atmosphere within the housing, and means for holding a mass of reactive metal. An electrode extends into the housing and comprises an outer electrode tube enclosed at its lower end and an electrode tip supported by the enclosed lower end of the outer electrode tube. A plurality of vertical passages within the outer electrode tube are provided for circulating a cooling fluid. The cooling fluid which comprises at least one alkali metal (preferably a sodium-potassium alloy), substantially fills the passages. A cooling fluid expansion chamber, which is in open communication with the cooling fluid within the outer electrode tube, is provided at the upper end of the electrode tube. The cooling fluid and expansion chamber are hermetically sealed from the atmosphere. Adjacent the upper portion of the outer electrode tube a liquid metal pump means is provided for circulating the cooling fluid through the passages within the outer electrode tube. This pump is preferably an electromagnetic pump so that no moving parts need penetrate the hermetically-sealed electrode structure. There is also provided a heat exchange means below the liquid metal pump means and surrounding the outer electrode tube for extracting heat from the circulating cooling fluid. The liquid metal pump means and the heat exchange means are positioned on portions of the outer electrode tube which are at all times outside the arc furnace housing.

Referring now to the drawing, there is shown one preferred embodiment of the invention without intent to limit the scope thereof. An electrode assembly 10 in part passes through suitable vacuum seals 12 into a gastight or vacuum-tight chamber or housing 14. The housing 14 is arranged to be evacuated to a low-free air pressure on the order of a few microns Hg abs. by a vacuum pumping system schematically indicated at 15. The housing 14 is also preferably arranged to be subjected to a reduced pressure or even an atmospheric pressure of an inert gas such as argon from a suitable supply 17. As used in the specification and claims, the term "inert atmosphere" shall include both inert gas and vacuum conditions. At the lower end of the housing 14 there is a suitably cooled crucible or mold 19 for containing the arc melted metal 21 here shown as a lower solidified portion and an upper molten portion. Instead of the cold mold shown, there can be employed a "skull" melting crucible and suitable molds such as described and illustrated in U.S. Patent No. 2,789,150.

The electrode assembly, as illustrated, comprises preferably an outer electrode tube 16 and an inner tube 18. The outer electrode tube 16 is enclosed at its lower end. Supported by or attached to the enclosed lower end of the outer tube 16 is an electrode tip 20 of suitable material, for example tungsten. The outer electrode tube 16 is provided with a thick wall of a material of a high heat conductivity e.g. copper, and is the principal conductor of current to the electrode tip 20. The inner tube 18 preferably but not necessarily, is formed of a heat insulating material smaller than the outer electrode tube 16 and defines a cooling fluid passage 22 with the outer tube 16. The inner tube 18 is in open communication with the cooling fluid passage 22 at its lower end and also near its upper end by a plurality of openings or apertures 24.

The cooling fluid 26, which consists of at least one alkali metal, substantially fills the inner tube 18 and the cooling fluid passage 22. The preferable cooling fluids are sodium-potassium alloys, and particularly such an alloy containing about 78 percent by weight potassium. The preferred alloy is in the liquid phase at room temperature. Since metal employed as cooling fluids expand with increasing temperatures, an expansion chamber or tank 28 is provided in open communication with the upper end of the inner tube 18. The expansion tank 28 is provided with air-tight closure means 30 through which the cooling fluid can be charged. The cooling fluid within the inner tube 18 and cooling fluid passage 26, and the expansion chamber 28 are sealed from the atmosphere so as to prevent the entry of oxygen into the system and from contact with the metallic cooling fluid. Vertical movement can be imparted to electrode assembly 10 by attaching it through connecting means 36 to a suitable moving mechanism (not shown). Liquid metal pump means 32 is illustrated only schematically and is preferably an electromagnetic pump which is provided adjacent the upper portion of the outer tube 16 for circulating the cooling fluid 26 through openings 24, down inner tube 18 and up cooling fluid passage 22. The electromagnetic pump employed can be of the D.C. Faraday type or A.C. moving field type. A preferred type of pump is that shown in U.S. Patent 2,808,002. Below the liquid metal pump means 32 and surrounding the outer electrode tube 16, there is provided heat-exchange means 34 here shown as a coil surrounding the outer tube and cooled by a suitable medium such as water. Both the liquid metal pump means 32 and heat-exchange means are attached to portions of the outer tube 16 which are at all times outside the arc furnace housing 14. Thus no water even that employed for extracting heat from the circulating cooling fluid 26, is caused to be present within the furnace 14 by the electrode assembly 10. Moreover, even should a leak develop in the outer tube 16 permitting the introduction of the metallic cooling fluid into the furnace 14 and into contact with the molten refractory metal, there would be no disastrous explosions.

Since certain changes can be made in the above apparatus without departing from the scope of the invention herein involved, it is intended that all matter contained in the above description, or shown in the accompanying drawing shall be interpreted as illustrative and not in a limiting sense.

What is claimed is:

1. An arc furnace for the melting of reactive metals such as titanium which comprises a gas-tight housing, means for creating a substantially inert atmosphere within said housing, means for holding a mass of reactive metal within said housing, an electrode assembly extending in part into said housing and comprising an outer electrode tube enclosed at its lower end, an electrode tip supported by the enclosed lower end of said outer electrode tube, an inner tube positioned within said outer electrode tube, said inner tube being smaller than the outer electrode tube and defining a cooling fluid passage with the outer electrode tube, a cooling fluid expansion chamber in open communication with the inner tube at its upper end, said inner tube being in open communication with the cooling fluid passage at its lower end and near its upper end, a cooling fluid comprising at least one alkali metal substantially filling said inner tube and said cooling fluid passage, said cooling fluid and said expansion chamber being sealed from the atmosphere, liquid metal pump means adjacent the upper portion of said outer electrode tube for circulating said cooling fluid through and down said inner tube and up said cooling fluid passage, heat exchange means below said liquid metal pump means and about said outer electrode tube for extracting heat from the circulating cooling fluid, said liquid pump means and said heat-exchange means being positioned about portions of the outer electrode tube which are at all times outside the arc furnace.

2. The arc furnace of claim 1 wherein the cooling fluid comprises a sodium-potassium alloy containing about 78 percent by weight potassium.

3. An arc furnace for the melting of reactive metals such as titanium which comprises a gas-tight housing, means for creating a substantially inert atmosphere within said housing means for holding a mass of reactive metal within said housing, an electrode extending in part into said housing and comprising two concentric tubes, an outer tube, said outer tube enclosed at its lower end with an electrode tip supported by the enclosed lower end, an inner tube smaller than the outer tube and defining a cooling fluid passage with the outer tube, a cooling fluid expansion chamber in open communication with the inner tube at its upper end, said inner tube being in open communication with the cooling fluid passages at its lower end and near its upper end, a cooling fluid comprising at least one alkali metal substantially filling said inner tube and said cooling fluid passage, said cooling fluid and said expansion chamber being sealed from the atmosphere, electromagnetic pump means adjacent the upper portion of said outer tube for circulating said cooling fluid through and down said inner tube and up said cooling fluid passage, heat-exchange means below said electromagnetic pump means and about said outer tube for extracting heat from the circulating cooling fluid, said electromagnetic pump means and said heat-exchange means being positioned about portions of the outer tube which are at all times outside the housing of the arc furnace.

4. The electrode of claim 3 wherein the heat exchange means comprises cooling coils around the outer tube.

5. The electrode of claim 3 wherein the cooling fluid comprises a sodium and potassium alloy containing about 78 percent by weight potassium.

6. An arc furnace for the melting of reactive metals such as titanium which comprises a gas-tight housing, means for creating a substantially inert atmosphere within said housing, means for holding a mass of reactive metal within said housing, an electrode assembly extending in part into said housing and comprising an electrode tube enclosed at its lower end, an electrode tip supported by the enclosed lower end of said electrode tube, a plurality of vertical passages within the electrode tube, a cooling fluid comprising at least one alkali metal substantially filling said passages, a cooling fluid expansion chamber at the upper end of said electrode tube which is in open communication with the cooling fluid within said electrode tube, said cooling fluid and said expansion chamber being sealed from the atmosphere, liquid metal pump means adjacent the upper portion of said electrode tube for circulating said cooling fluid through said passages, heat exchange means below said liquid metal pump means and about said electrode tube for extracting heat from the circulating cooling fluid, said liquid pump means and said heat exchange means being positioned about portions of the electrode tube which are at all times outside the housing of the arc furnace.

References Cited in the file of this patent
UNITED STATES PATENTS

| | | |
|---|---|---|
| 2,219,611 | Berghaus et al. | Oct. 29, 1940 |
| 2,800,519 | Garmy | July 23, 1957 |
| 2,871,533 | Swainson | Feb. 3, 1959 |